(12) United States Patent
Jansen et al.

(10) Patent No.: US 6,197,269 B1
(45) Date of Patent: Mar. 6, 2001

(54) METHOD FOR ABSORBING GASEOUS OXIDIZABLE OR REDUCIBLE CONSTITUENTS THROUGH A MEMBRANE

(75) Inventors: Albert Edward Jansen, Houten; Paul Hubert Maria Feron, Zeist, both of (NL)

(73) Assignee: Nederlandse Organisatie Voor Toegepast-Natuurwetenschappelijk Onderzoek (TNO), Delft (NL)

(*) Notice: Subject to any disclaimer, the term of this patent is extended or adjusted under 35 U.S.C. 154(b) by 0 days.

(21) Appl. No.: 08/981,325

(22) PCT Filed: Jul. 5, 1996

(86) PCT No.: PCT/NL96/00279
§ 371 Date: Mar. 6, 1998
§ 102(e) Date: Mar. 6, 1998

(87) PCT Pub. No.: WO97/02883
PCT Pub. Date: Jan. 30, 1997

(30) Foreign Application Priority Data

| Jul. 7, 1995 | (NL) | 1000755 |
| Jul. 7, 1995 | (NL) | 1000756 |
| Jul. 7, 1995 | (NL) | 1000757 |

(51) Int. Cl.[7] .................... C01B 17/04; B01D 63/02; B01D 71/00
(52) U.S. Cl. .............. 423/243.01; 423/243.04; 502/4; 210/679; 95/45; 95/49
(58) Field of Search ............. 502/4; 423/243.01, 423/243.04, 245.1, 215.5; 210/679, 914; 95/43, 45, 49

(56) References Cited

U.S. PATENT DOCUMENTS

| 3,911,080 | * | 10/1975 | Mehl et al. | 423/210 |
| 4,101,631 | * | 7/1978 | Ambrosini et al. | 423/210 |
| 4,115,514 | * | 9/1978 | Ward, III | 423/232 |
| 4,147,754 | * | 4/1979 | Ward, III | 423/224 |
| 4,174,374 | * | 11/1979 | Matson | 423/232 |
| 4,187,086 | * | 2/1980 | Walmet et al. | 55/16 |
| 4,516,984 | | 5/1985 | Warner et al. | |
| 4,750,918 | * | 6/1988 | Sirkar | 55/16 |
| 5,135,547 | * | 8/1992 | Tsou et al. | 55/16 |
| 5,749,941 | * | 5/1998 | Jansen et al. | 95/44 |

FOREIGN PATENT DOCUMENTS

| 9416800 | * | 8/1994 | (AT) | B01D/61/36 |
| 0 634 204 | | 1/1995 | (EP) . | |
| WO 94/16800 | | 8/1994 | (WO) . | |

* cited by examiner

Primary Examiner—Steven P. Griffin
Assistant Examiner—Elin A Warn
(74) Attorney, Agent, or Firm—Browdy and Neimark

(57) ABSTRACT

Membrane gas adsorption is conducted wherein the gas phase contains mercury in the gaseous state and the liquid phase containing at least one oxidizing agent for mercury such that the mercury in the gaseous state is absorbed into the liquid phase, and an oxidation/reduction reaction between the mercury and the oxidizing agent takes place in one step.

26 Claims, 1 Drawing Sheet

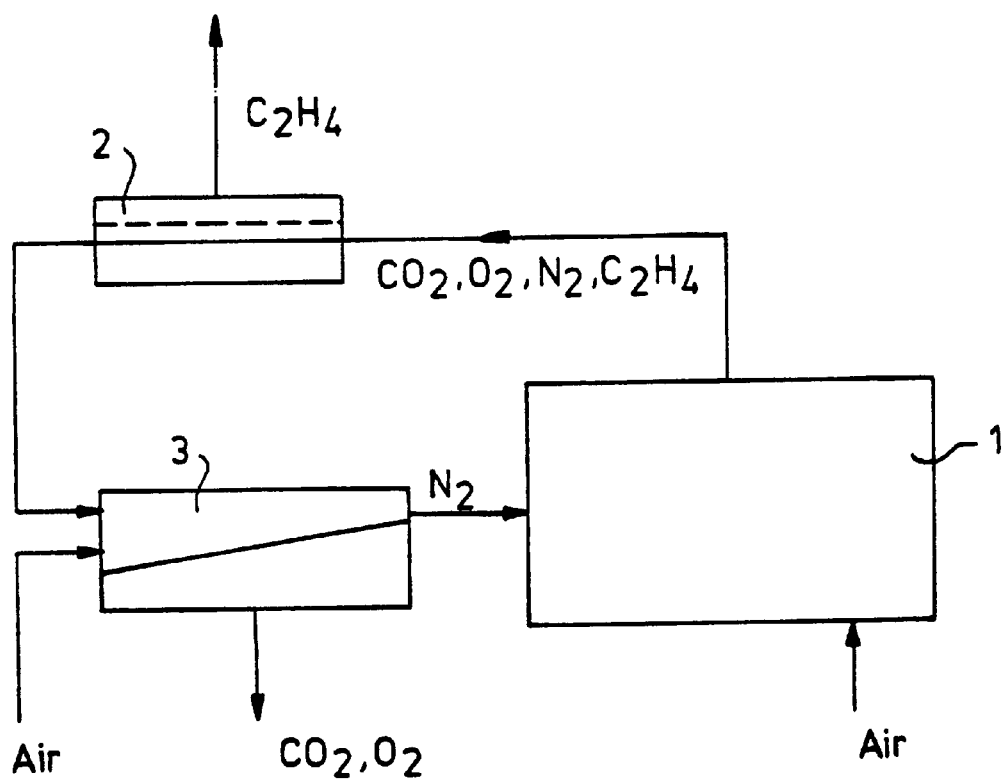

METHOD FOR ABSORBING GASEOUS OXIDIZABLE OR REDUCIBLE CONSTITUENTS THROUGH A MEMBRANE

FIELD OF THE INVENTION

The present invention relates to a method for the removal of gaseous oxidisable constituents from, a gas phase.

BACKGROUND OF THE INVENTION

It is known to absorb gaseous constituents from a gas phase using conventional contact techniques and conventional contact equipment, such as packed columns.

However, this technique has the disadvantage in that it is possible to operate only within a restricted range of gas/liquid flow rate ratios because otherwise operational problems occur, such as, for example, "flooding" or the entrainment of liquid. The consequence of this is, in particular, that when removing components at low concentration levels it is necessary to work outside the optimum operating conditions of the equipment used (gas/liquid ratio 100:1–1:100) and/or with a liquid flow rate higher that is strictly necessary, in order to obtain an optimum loading and/or in order to be able to remove the components effectively.

Said known techniques are therefore not suitable for the removal of gaseous impurities which are present in low to very low concentrations (i.e. below 1 mg/m$^3$). Even in those cases where the gaseous impurities can be removed by means of the conventional absorption techniques, said techniques will not be cost-effective or will be barely cost-effective because of the high liquid flow rates required.

Furthermore, in the case of said known contact techniques absorption usually proceeds via an acid/base reaction, as a result of which the field of application is restricted to gaseous constituents which can be absorbed via a mechanism of this type. The use of redox reactions in the absorption of gaseous constituents has not been described to date.

SUMMARY OF THE INVENTION

A first aim of the invention is, therefore, to provide an efficient and cost-effective process by means of which gaseous, oxidisable impurities can be removed from a gas stream in a simple manner, especially in low concentrations.

It has now been found, surprisingly, that a system of this type can be provided by the use of membrane gas absorption techniques using oxidative liquid phases, that is to say liquid phases which contain an oxidising agent.

A second aim of the invention is, therefore, to render membrane gas absorption techniques applicable to and/or to adapt said techniques for use with, such oxidative liquid phases. Further aims and advantages of the invention will become apparent from the text which follows.

Membrane gas absorption techniques, as well as the equipment used for these, have been disclosed in the prior art.

Thus, Netherlands Patent Applications 9400438 and 9401233 in the name of the Applicant, which are not prepublished, describe methods for the absorption of acidic gaseous impurities, such as $CO_2$ and $SO_2$, from a gaseous stream by means of membrane gas absorption, the gas stream containing the acidic impurities to be removed being brought into contact with a liquid stream which absorbs the components to be removed. During this process the gas stream and the liquid stream are kept separate by means of a porous or non-porous ("closed") membrane, so that said streams are not mixed with one another.

It is also, for example, known from International Patent Applications 94-01204 and 91-15284 to absorb water vapour from a gas stream by means of membrane gas absorption, in which method a highly hygroscopic liquid absorbent is used.

In the case of the procedures in the cited publications, the absorption of the gaseous component to be absorbed proceeds by means of absorption into the liquid phase, via an acid/base reaction or by means of hygroscopic interaction.

The use of oxidation/reduction reactions in membrane gas absorption for the absorption of oxidisable gaseous impurities has to date neither been described nor suggested. On the contrary, to date it has been assumed that membrane gas absorption could not be carried out on the basis of oxidation/reduction reactions, especially because it was thought that the absorption process—that is to say the absorption of the uncharged gaseous, frequently organic, impurities to be absorbed into the liquid phase and/or the envisaged redox reactions in the liquid phase—would proceed too slowly (i.e. low transfer because of low solubility in water) and/or would be insufficiently stable (because of, for example, attack on the membrane). It will be clear that problems of this type do not arise, or rarely arise, with small polar acidic or basic molecules, such as $CO_2$ or $SO_2$, or with water (vapour)—which to date have been removed using membrane gas absorption.

The present invention is based, inter alia, on the surprising discovery that the combination of absorption of the gaseous constituents and the subsequent oxidation/reduction reactions proceed so rapidly that a membrane gas absorption system based on said redox reactions gives adequate mass transfer to enable it to be used in practice.

The invention is further based on the discovery that it is possible to carry out membrane gas absorption using an oxidising liquid absorbent without the membranes being used in this operation being attacked, the membrane starting to leak or any pores present becoming clogged.

Furthermore, it has been found that the membrane gas absorption according to the invention is particularly suitable for the removal of low to very low concentrations of impurities which are impossible to remove, extremely difficult to remove or cannot be removed economically using alternative methods from the prior art—such as, for example, catalytic oxidation, an ozone scrubber, gas washing without the separating action of membranes, or filtration using an oxidising agent such as potassium permanganate. Finally, the method according to the invention gives a high loading capacity of the liquid absorbent.

The invention provides, in particular, methods for the removal of mercury vapour, ethene or $H_2S$ from a gas stream in very low concentrations, these being methods for which a need has already existed for a long time.

DETAILED DESCRIPTION OF THE INVENTION

In a first aspect the invention therefore relates to a method of the type described above, characterised in that the oxidisable constituents are absorbed in a liquid which contains an oxidising agent for the gaseous oxidisable constituents, the gas phase and the liquid phase being fed on either side along/over a membrane which is permeable to the impurities to be absorbed.

The invention further relates to a method for performing membrane gas absorption, characterised in that:
the gas phase contains at least one gaseous oxidisable constituent, the liquid phase contains at least one oxidising agent, such that at least one of the gaseous oxidisable constituents is absorbed into the liquid phase, an oxidation/reduction reaction between the gaseous constituents and the oxidising agent taking place in at least one step.

The method according to the invention can be carried out by means of conventional membrane gas absorption techniques, a gas stream and a liquid absorbent being fed on either side over the membrane, usually in counter-current, the gas stream coming into contact with the liquid absorbent and/or the constituent to be absorbed being absorbed into the liquid absorbent. Techniques of this type are described in more detail in the references cited above. Furthermore, European Patent Applications 0 451 715 and 0 509 031 describe installations for carrying out membrane gas absorption techniques. All these citations are incorporated herein by reference and can be employed analogously for the present invention, except that, according to the invention, a liquid absorbent is used which contains an oxidising agent, so that the absorption proceeds in whole or in part (for example after prior absorption in the liquid) by means of a redox reaction, which, moreover, advantageously accelerates the absorption. However, the invention is not restricted to a specific mechanism for the absorption, as long as in at least one step an electron transfer between the constituent to be removed and the oxidising agent present in the liquid phase takes place.

The membranes used can be employed in any desired form, such as in the form of flat membranes containing channels, the so-called "plate and frame modules", both in co-current and in counter-current (which is preferred) or in the form of spirally wound flat membranes (spiral-wound membranes), as will be apparent to a person skilled in the art. However, the invention is preferably and advantageously employed with the aid of hollow fibre membranes, which make it possible for a large exchange surface area per unit volume to be obtained, as a result of which very compact equipment can be employed. A further advantage is that the gas channel (outside the fibres) can be made very much larger than the liquid channel (inside the fibres).

The membranes are preferably constructed in the form of so-called membrane modules, in particular hollow fibre membrane modules. Most preferentially, a module is used in which the flow impinges transversely on the membrane fibre. A module of this type which is described in European Patent Application 0 509 031, the contents of which are incorporated herein by reference, offers advantages such as being easy to scale up, low pressure drop and high mass transfer.

The use of hollow fibre membranes as the contact medium can, in principle, reduce the dimensions of an absorption installation, because large exchange surfaces (greater than 1000 $m^2/m^3$) are achievable with commercially available membranes. Compared with conventional packed columns, which usually have a specific surface area of about 100 $m^2/m^3$, this is appreciably higher. As a result, significant reductions in the size of the equipment can be achieved.

In addition, there are further advantages:
complete freedom of choice of gas/liquid flow rates;
no entrainment, flooding or foaming;
low pressure drop on the gas side, low percentage outflow surface area with membranes;
low liquid hold-up;
counter-current operations are readily adjustable with the aid of internally switched segments.

Furthermore, according to the invention a mass transfer K of $10^{-4}$ m/s or higher is surprisingly and advantageously obtained.

The membrane can be a porous or non-porous ("closed") membrane, porous, sufficiently hydrophobic membranes generally being preferred.

The membrane can be made of any suitable material, such as polypropene (PP), polyethene (PE), polytetrafluoroethene (PTFE), polyvinylidene fluoride (PVDF) and polysulphone (PSU). The invention can also be employed with coated or treated membrane systems, such as plasma membranes, membranes coated with silicone rubbers (PDMS), fluorine-treated membranes and the like.

Preferably, a membrane material is used which is highly resistant to chemical attack, in particular chemical attack by oxidising agents. In this regard, membranes made of PTFE are to be preferred, whilst polyethene and polypropene membranes are to be preferred from the standpoint of cost.

The hollow fibre membranes which can be used are not restricted to a specific diameter of the fibre used. However, it will be clear to those skilled in the art that fibres of small diameter, such as polypropene or polyethene fibres having a diameter of 0.01–1 mm are to be preferred. Fibres of this type can be manufactured efficiently in the form of fibre mats, which can be processed simply to give a module. However, it can also be that PTFE fibres of larger diameter are to be preferred from the standpoint of chemical resistance.

The invention can also be employed in conventional membrane gas absorption equipment, provided said equipment is of such construction that the various components thereof are not attacked by the oxidisable constituents in the gas stream and/or the liquid phase containing the oxidising agent.

The invention can be used in general for the removal of oxidisable constituents from gas streams. Said constituents will usually be gaseous organic or inorganic impurities; examples are, inter alia:
the removal of mercury vapour from discharge streams or natural gas:
the removal of ethenically unsaturated organic compounds, for example ethene, in the storage of fruit;
the removal of odour from a discharge stream;
$H_2S$ from biogas/discharge gas, in which case the $H_2S$ is converted to sulphur.

Although it is not restricted to a specific concentration, the invention is particularly suitable for the removal of impurities which are present in concentrations of 0.001–10 $mg/m^3$, more preferentially 0.01–1 $mg/m^3$, in the gas stream.

The liquid phase used will in general be a solution of a suitable oxidising agent which is soluble in the solvent used. Usually, and preferably, water or aqueous solvents will be used, water being the most preferred. However, it is also possible to use organic solvents or mixtures thereof, with one another or with water. Thus, for example, polar solvents such as DMF and DSMO (which in themselves can also be involved in the redox reaction) or mixtures thereof with water and/or organic solvents can be used.

Furthermore, the liquid phase can be acidified, for example with sulphuric acid, or rendered alkaline. This can catalyse the redox reaction, depending on the oxidising agent used, and/or accelerate the absorption step, for example via a (further) acid/base absorption mechanism. An example is oxidation with potassium permanganate, which in general is carried out in a highly acidic medium, usually by acidifying the liquid phase with concentrated sulphuric acid. Other examples of oxidising agents which can advantageously be used in acidic and/or alkaline medium will be apparent to those skilled in the art.

The oxidising agent is selected such that it is capable of oxidising the impurities to be removed. To this end, the standard electrode potential of the redox couple of the oxidising agent will in general be greater than the standard electrode potential of the oxidisable impurities present in the gas stream. Standard electrode potentials and methods for the determination thereof are generally known and are cited, for example, in the Handbook of Chemistry and Physics, 2nd Ed., D 156–D 163. It will be apparent to a person skilled in the art which oxidising agents are, by virtue of their standard electrode potential, suitable for the removal of a specific impurity.

The oxidising agents used must, however, also be so chosen that they do not attack the membrane materials used. The same applies in respect of the concentrations of the oxidising agents used, the solvents used, the further substances present in the liquid phase and the further conditions under which the absorption is carried out, such as the temperature and the transport speeds of the gas phase and liquid phase.

Whether or not a suitable liquid absorbent can be used with a specific membrane module can be determined in a simple manner by suspending the membrane material in an intended liquid absorbent and after some time—which can range from minutes to days—removing the membrane from the liquid absorbent again and inspecting it, for example visually, for oxidative attack, such as weakening of the material, discolouration or a change in the pore geometry or pore size, as well as the hydrophobic properties, as will be generally known to a person skilled in the membrane field. Those skilled in the art will also, by virtue of their general specialist knowledge, and on the basis of the prior art cited above, which is incorporated herein by reference, be capable of selecting the other conditions in a suitable manner. For instance, the temperature will in general be between the freezing point and the boiling point of the liquid phase used and in general between 0° and 80° C., preferably between 20° and 60° C., partly depending on the surface tension of the liquid phase used and the stability of the membrane used. For instance, teflon membranes will in general tolerate a higher temperature.

Some possible oxidising agents/liquid absorbents are permanganate solutions, such as potassium permanganate, preferably in an acidic medium; manganese dioxide; chromic acid; dichromate solutions, in particular potassium dichromate; hydrogen peroxide solutions; $Fe^{3+}$ solutions, in particular solutions of iron(III) chloride; selenium dioxide solutions; mercury perchlorate solutions; solutions of silver nitrate or mercury nitrate; solutions of iodine pentoxide; solutions of concentrated nitric acid, solutions of chlorine bleach, solutions of metal complexes, such as $Fe(CN)_6^{3-}$; an ammonia solution of silver oxides, solutions or mixtures of $Br_2$;

KI/I($Hg+I_2 \rightarrow HgI_2$; $HgI_2+2I \rightarrow HgI_4^-$), i.e. iodine/iodine/potassium
persulphate ($S_2O_8^-$)
Caro's acid (=$H_2SO_4+H_2O_2 \rightarrow SO_5^-$)
sodium chlorate ($NaClO_3$)
superoxide
Fenton's reagent ($Fe^{2+}+H_2O_2 \rightarrow Fe^{3+}+OH^-+OH^-$)
$O_3/Cl^-$
the $Ce^{4+}/Ce^{3+}$ couple
the $Cr^{4+}/Ce^{3+}$ couple, such as Jones reagent and Collings reagent
organic peroxides, such as peroxybenzoic acid, metachloroperoxybenzoic acid, $CH_3CO_3H$, $CF_3CO_3$.
oxidising agents based on transition metals, such as $OsO_4$, $RhO_4$.

Other suitable oxidising agents will be apparent to those skilled in the art and are cited in the generally known manuals, the contents of which are incorporated herein by reference.

Although all these liquid absorbents can be used, it will be clear that solutions which have only a minor corrosive action are to be preferred. Furthermore, it is preferable that no oxidation products are formed during the gas absorption which are insoluble in the liquid absorbent used, which could give rise to the formation of precipitates which would be able to clog the membranes, although this latter embodiment certainly falls within the scope of the invention.

In view of these factors, solutions of $Fe^{3+}$, in particular iron(III) chloride, and solutions of hydrogen peroxide will be preferred for the majority of applications.

The liquid phase can furthermore contain catalysts and complex-forming agents known per se, which, for example, are able to improve the solubility of the reagents used and/or of the absorbed and/or oxidised constituents. It is also possible to use, for example, crown ethers, in particular in organic liquid phases.

The absorbent can be prepared simply by dissolving the oxidising agent in/mixing the oxidising agent with water or another suitable solvent or solvent mixture. The concentration of the oxidising agent is not restricted, but in general will be as high as possible, that is to say saturated or almost saturated (i.e. within 5M, preferably within 2M of the concentration at saturation of the specific component, as can be determined in a known manner by a person skilled in the art), unless a lower concentration is more suitable from the standpoint of surface tension or too high a viscosity of the liquid or too extensive an attack on the membrane, as will be apparent to those skilled in the art. As already stated, the liquid absorbent obtained in this way can be used analogously to known liquid absorbents, provided the other requirements of the invention are met.

The oxidation reaction in general leads to an improvement in the solubility in water of the constituents taken up from the gas phase, which, in turn, has an advantageous effect on the mass transfer and/or on the loading capacity of the liquid phase. Without being restricted to this, the Henry coefficient will be brought down to a value of at most 1, preferably at most 0.5 and more preferentially at most 0.1 during the oxidation. It will be clear that because of said increase in the solubility in water aqueous liquid phases will in general be preferred.

The oxidised impurities taken up in the liquid phase can optionally be separated off from the liquid phase after absorption, after which the liquid absorbent can be regenerated, for example by heating or, if appropriate, by a further redox reaction. The separation of the absorbed impurities can be carried out in any suitable manner, for example by precipitation, sedimentation and/or filtration. It is also possible to allow the liquid absorbent to recirculate in a loop, in which case absorption of the impurities, separation of the absorbed and oxidised impurities and regeneration of the liquid absorbent are carried out as a continuous process.

The invention will now be described in more detail below with reference to two non-limiting specific preferred embodiments which again make it clear that the invention can find practical application in very diverse fields.

1. Integrated removal of ethene when storing fruit

After it has been picked or harvested, fruit is stored in storage chambers under a so-called "controlled atmosphere" (CA conditions), the concentrations of gases such as $CO_2$, $O_2$ and $N_2$ the storage chamber—usually a cold cell—being accurately controlled. By means of the accurate control of the concentrations of these constituents it is possible to store fruit for a prolonged period, enabling the fruit producer to bring his product onto the market at the most opportune point in time.

In practice, the control of the oxygen and carbon dioxide concentrations is carried out by means of membrane gas separation techniques, membranes being used which, under the influence of a pressure difference, allow more oxygen and carbon dioxide to pass through than nitrogen. With this technique, therefore, no use is made of a liquid absorbent, as in the case of membrane gas absorption.

Significant operational disadvantages of membrane gas separation techniques are that heat is generated on compression, which heat cannot be usefully employed. Moreover, the separating capacity of gas separation membranes decreases as the temperature rises, whilst the membrane flow rises.

A further disadvantage of these membrane gas separation techniques is that they cannot be used, or can barely be used, for the removal of ethene, which is liberated when fruit is stored as a consequence of ripening. As will be generally known to those skilled in the art, ethene is a plant hormone that, in turn, accelerates the ripening, and thus the ageing, of fruit. Consequently, the shelf life of fruit in storage is limited.

In the prior art, ventilation of the store is used to remove ethene. However, this leads to loss of cold, and also to the inflow of air from the outside, as a result of which the composition of the air in the cell is adversely affected.

Other systems for the removal of ethene which are described in the prior art are:

catalytic oxidation;

an ozone scrubber;

gas washing with potassium permanganate (that is to say without the separating action of membranes);

a filter based on potassium permanganate.

However, these techniques are either not completely satisfactory at low concentrations or—as in the case of the potassium permanganate filter—are relatively expensive, because, for example, the performances deteriorate under moist conditions.

An efficient method for removing ethene from a storage chamber, in particular in the case of the very low ethene concentrations which arise when storing fruit, is therefore highly desirable.

In a further aspect the invention therefore relates to a method for the removal of ethene from ethene-containing gas phase, the ethene being absorbed in a liquid phase which contains an oxidising agent for ethene, characterised in that the gas phase and the liquid phase are fed on either side over a membrane which is permeable to ethene.

This preferred aspect will be carried out in the manner described above in the general section, in which context the gaseous impurity must be taken to be ethene. A typical ethene concentration will in this case be in the range 0.001–100, more particularly 0.01–10, ppm.

The invention also relates to a method for carrying out membrane gas absorption, characterised in that:

the gas phase contains ethene, the liquid phase contains at least one oxidising agent, such that the ethene is absorbed into the liquid phase, an oxidation/reduction reaction between the ethene and the oxidising agent taking place in at least one step.

Suitable liquid absorbents are, inter alia:

hydrogen peroxide solutions, potassium permanganate solutions, chromic acid and bichromate solutions, selenium dioxide solutions, mercury perchlorate solutions, solutions of silver nitrate or mercury nitrate, solution of iron(III) chloride, solutions of iodine pentoxide.

The ethene is captured by these liquid absorbents by means of, inter alia, oxidation, or initially complex formation followed by oxidation, during which reaction, for example, water-soluble products such as carbon dioxide, alcohols and glycols can be formed. With regard to the reaction of ethene with peroxide see Roberts, Stuart and Caserio, Organic Chemistry, Ed. W. A. Benjamin Inc., Menlo Park, Calif., USA, pp. 261. In this context it is, in particular, surprising that a mass transfer which is adequate for practical applications and a high capacity are obtained with ethene, even though the latter is generally sparingly soluble in aqueous liquids.

The aspect of the invention under consideration therefore makes it possible efficiently to remove ethene from a gas stream originating from a store for fruit under "controlled atmosphere" conditions without the carbon dioxide and oxygen concentrations being adversely affected, as is the case with ventilation. A particular advantage of this aspect of the invention is, furthermore, that the use of aqueous liquid absorbents makes it possible also to cool and to moisten the gas stream at the same time when removing ethene. This is a significant advantage compared with so-called "dry" ethene removal systems—such as those mentioned above—and results in an appreciable improvement in the total energy efficiency and consumption, because the total cooling requirement for the cooled storage chamber is reduced.

According to the aspect of the invention, the membrane gas absorption equipment used is particularly advantageously incorporated in existing gas separation systems for cold chambers with a controlled atmosphere, for example by incorporating the membrane gas absorption equipment using the oxidising liquid absorbent into the gas cycle in which $CO_2$, $N_2$ and $O_2$ are removed.

The advantages of an integrated system of this type, as shown diagrammatically in the FIGURE where 1 is the cold cell, 2 the ethene membrane absorber and 3 the membrane gas separator, are, inter alia:

that the compressor heat can be used to increase the efficiency of ethene removal and the possibility, which has already been mentioned, for cooling, in particular evaporation cooling, downstream of the compression step, and also an overall improvement in the performance of the gas separation step.

Further advantages, such as optimisation of the energy efficiency and minimisation of the energy consumption, will be apparent to those skilled in the art.

The invention therefore further relates to a store for fruit, in particular a cold cell, as well as to an installation for controlling the atmospheric conditions in a fruit store, which are effectively provided with an installation for membrane gas absorption for the removal of ethene. With this arrangement, an oxidative liquid absorbent will, of course, be used in the membrane gas absorption installation, as described above.

The invention finally relates to a method for storing fruit in a store, the ethene concentration in the air in the store being reduced by means of a method and/or installation as described above.

2. Removal of mercury vapour from an off-gas stream

Mercury-containing off-gas streams are a very great problem from an environmental standpoint. Such mercury-containing off-gas streams are, for example, liberated when processing fluorescent tubes, which can contain appreciable amounts of mercury.

Furthermore, natural gas also contains an appreciable amount of mercury vapour, which from the standpoint of environmental engineering has to be removed. The presence of mercury vapour in natural gas also imposes limitations on the subsequent chemical treatment thereof, because mercury vapour can poison certain catalysts used for this purpose.

In the prior art mercury is removed by means of filters based on active charcoal, which are impregnated with sulphur compounds. However, in this case it is not possible to regenerate the active charcoal used, that is to say to remove the absorbed mercury vapour therefrom, and the spent active charcoal must therefore be disposed of as chemical waste. In view of the very low loading which can be obtained with active charcoal filters, a new waste product is thus created, that is to say the active charcoal loaded with mercury.

There is therefore a need for a method with which mercury vapour can be removed from a gas stream quickly and simply, as well as inexpensively and selectively, without an extensive new waste problem being created as a result.

This aspect of the invention therefore relates to a method for the removal of mercury vapour from a gas phase containing mercury vapour, the mercury vapour being absorbed in a liquid phase which contains an oxidising agent for mercury vapour, the gas phase and the liquid phase being fed on either side over a membrane which is permeable to mercury vapour.

This preferred aspect of the invention will be carried out in the manner described above in the general section, in which context the gaseous impurity must therefore be taken to be mercury or mercury vapour.

A typical mercury concentration in this context will be in the range 0.01–50, more particularly 0.01–20, mg/m$^3$.

In this context it is, in particular, surprising that a mass transfer adequate for practical application and high capacity are obtained with mercury vapour, even though the latter is in general sparingly soluble in aqueous liquids.

Furthermore, application of this aspect of the invention offers the advantage that mercury vapour can be removed efficiently and so as to produce a high degree of purification, even when said vapour is present in very low concentrations. With conventional contact absorption techniques, a very large excess of liquid absorbent would have to be used for the low concentrations present in order to prevent operational problems, or, alternatively, recirculation would have to be employed, which requires (pump) energy. As accurate control is possible with membrane gas absorption by means of gas/liquid flow rates, these problems are prevented according to the invention.

The invention furthermore relates to a method for carrying out membrane gas absorption, characterised in that the gas phase contains mercury vapour, the liquid phase contains at least one oxidising agent for mercury, such that the mercury vapour is absorbed into the liquid phase, an oxidation/reduction reaction between the mercury and the oxidising agent taking place in at least one step.

Oxidising agents/liquid phases preferably used are:

concentrated nitric acid, chlorine bleach, hydrogen peroxide permanganate solutions, dichromate solutions, ammonia solutions of silver chloride, $Fe^{3+}$ solutions, in particular solutions of $FeCl_3$.

KI/I($Hg+I_2 \rightarrow HgI_2$; $HgI_2$; $+2I \rightarrow HgI_4=$), i.e. iodine/iodine/potassium, persulphate ($S_2O_8^-$)

Caro's acid ($=H_2SO_4+H_2O_2 \rightarrow SO_5^-$)

sodium chlorate ($NaClO_3$)

superoxide

Fenton's reagent ($Fe^{2+}+H_2O_2 \rightarrow Fe^{3+}+OH^-+OH^-$)

$O_3/Cl^-$ $Ce^{4+}/Ce^{3+}$

Of these oxidising agents, iron(III) chloride and hydrogen peroxide are preferred because these are inexpensive and show little interaction with the membrane.

The removal of mercury vapour in general proceeds in accordance with the following half-reactions, on their own or in combination:

$Hg \rightarrow Hg^+ + e^-$ $Hg \rightarrow Hg^{2+} + 2e^-$ $Hg^+ \rightarrow Hg^{2+} + e^-$ Liquid absorbents in which the chloride ion is present as an anion have the advantage that the oxidation of mercury vapour is also able to take place via the following half-reaction:

$Hg+Cl^- = HgCl+e^-$ which reaction has a lower standard electrode potential than the half-reactions mentioned above. This makes it possible, for example, to use $Fe(CN)_6^{3-}$ and similar metal complexes as oxidising agents.

In the case of the method according to the invention, absorption of mercury vapour will in general lead to a precipitate of an insoluble mercury salt, which is then separated off from the liquid absorbent, for example by filtration. The mercury salt thus obtained can then be disposed of as chemical waste. Compared with the conventional techniques for the removal of mercury, such as with the aid of active charcoal, the total volume to be disposed of, and thus the costs of transport and disposal thereof, will therefore be appreciably reduced in this case.

The invention has been described above more particularly with reference to two specific embodiments. Other applications of the oxidative membrane gas absorption technique according to the present invention, such as the oxidative removal of $H_2S$ from biogas or discharge gas with the formation of, for example, sulphur, will be apparent to those skilled in the art and therefore also fall within the scope of the present invention.

Furthermore, although the invention has been described above in particular with reference to the use of an oxidative liquid phase, it is also possible according to the invention to use a reductive liquid phase, that is to say a liquid phase which contains one or more reducing agents, for the removal of reducible constituents from a gas phase.

This aspect of the invention will in general be carried out in a manner analogous to that described above, "gaseous oxidisable constituents" and "oxidising agent" in this case of course having to be read as "gaseous reducible constituents" and "reducing agents". In other respects the same preferred embodiments and advantages as for the use of oxidative liquid phases also apply for this aspect of the invention.

Suitable reducing agents will be apparent to those skilled in the art and are described in the manuals. Examples are, inter alia, hydrogen donors, such as lithium aluminium hydrides, DIBAL, sodium borohydrides, copper(I) solutions, such as copper(I) chlorides and the like. In this case the standard electrode potential of the reducing agent used will in general be lower than the standard electrode potential of the gaseous constituent to be reduced, and in general the standard electrode potential will be lower than that of the $H^+/H_2$ couple, as will be apparent to those skilled in the art.

A preferred application of this embodiment of the invention is the removal of oxygen from a gas phase, such as air or flue gases, in particular at low concentrations, as mentioned above.

In the prior art cryogenic installations are used for the removal of oxygen, but these are, however, not cost-effective for such very low concentrations.

According to this aspect of the invention, oxygen is removed from the gas stream, for example using a solution of $SO_2$ in water, sulphite, bisulphite, sulphate or bisulphate being formed. Another possible reducing agent is $S_2O_3^{2-}$. It is also possible to reduce oxygen to water (vapour) or hydroxide ions.

This application is in particular suitable for the removal of oxygen from flue gas, an efficient removal being obtained even at very low oxygen concentrations.

We claim:

1. A method for performing membrane gas absorption wherein:
   the gas phase contains mercury in the gaseous state, the liquid phase contains at least one oxidizing agent for mercury, such that the mercury in the gaseous state is absorbed into the liquid phase, and an oxidation/reduction reaction between the mercury and the oxidizing agent takes place in one step.

2. A method for absorbing hydrogen sulfide from a gas phase containing hydrogen sulfide in a membrane unit comprising:
   bringing the gas phase containing hydrogen sulfide into contact with a liquid phase that contains an oxidizing agent for the hydrogen sulfide, wherein the gas phase and the liquid phase are separated by a membrane which is permeable to hydrogen sulfide.

3. The method according to claim 2 wherein the hydrogen sulfide is present in the gas phase in concentration so of $0.001-10$ mg/m$^3$.

4. The method according to claim 2 wherein the membrane is made of a material selected from the group consisting of polypropene, polyethene, polytetrafluoroethene, and polyvinylidene fluoride.

5. The method according to claim 4 wherein the hydrogen sulfide is present in the gas in the gas phase in concentrations of $0.001-10$ mg/m$^3$.

6. The method according to claim 5 wherein the hydrogen sulfide is present in the gas phase in the range of $0.01-1$ mg/m$^3$.

7. The method according to claim 4 wherein the membrane is in the form of hollow fibers.

8. The method according to claim 4 wherein the gaseous impurities are present in the gas phase in concentrations of $0.001-10$ mg/m$^3$.

9. The method according to claim 8 wherein the gaseous odorous impurities are present in the gas phase in the range of $0.01-1$ mg/m$^3$.

10. The method according to claim 1 wherein the hydrogen sulfide is converted to sulfur.

11. The method according to claim 2 wherein the membrane is selected from the group consisting of coated membranes and treated membranes.

12. The method according to claim 11 wherein the membrane is selected from the group consisting of plasma treated membranes, membranes coated with silicone rubbers, and membranes treated with fluorine.

13. The method according to claim 2 wherein the hydrogen sulfide is converted to sulfur.

14. The method according to claim 2 wherein the gas phase is selected from the group consisting of biogas and discharge gas.

15. A method for conducting membrane gas absorption wherein:
   the gas contains hydrogen sulfide,
   the liquid phase contains at least one oxidizing agent for hydrogen sulfide,
   the membrane is made of a material selected from the group consisting of polypropene, polyethene, polytetrafluoroethene, and polyvinylidene fluoride;
   such that the hydrogen sulfide is absorbed into the liquid phase, and an oxidation/reduction reaction between the hydrogen sulfide and the oxidizing agent takes place in at least one step.

16. The method according to claim 15 wherein the hydrogen sulfide is converted to sulfur.

17. The method according to claim 15 wherein the membrane is in the form of hollow fibers.

18. The method according to claim 15 wherein the membrane is selected from the group consisting of plasma membrane, membranes coated with silicone rubber, and fluorine-treated membranes.

19. The method according to claim 15 wherein the membrane is selected from the group consisting of coated membranes and treated membranes.

20. The method according to claim 15 wherein the hydrogen sulfide is converted to sulfur.

21. A method for absorbing gaseous mercury from a gas phase containing gaseous mercury in a membrane unit comprising:
   bringing the gas phase containing the gaseous mercury into contact with a liquid phase that contains an oxidizing agent for the mercury, the gas phase and the liquid phase being separated by a membrane which is permeable to gaseous mercury.

22. The method according to claim 21 wherein the mercury concentration is in the rage of $0.01-50$ mg/m$^3$.

23. The method according to claim 21 wherein the gas phase is natural gas.

24. A method for conducting membrane gas absorption wherein the gas phase is a discharge stream containing hydrogen sulfide, wherein the gas phase is selected from the group consisting of biogas, discharge gas, and mixtures thereof, the liquid phase contains at least one oxidizing agent for the hydrogen sulfide impurities, such that the hydrogen sulfide is absorbed into the liquid phase, and an oxidation/reduction reaction between the hydrogen sulfide and the oxidizing agent takes place in at least one step.

25. A method for absorbing gaseous odorous impurities from natural gas containing gaseous odorous impurities in the range of $0.1-1$ mg/m$^3$, comprising:
   contacting the natural gas with a liquid phase that contains an oxidizing agent for the odorous impurities, the gas phase and the liquid phase being separated by a membrane which is permeable to the odorous impurities.

26. The method according to claim 25 wherein the hydrogen sulfide is present in the gas phase in the range of $0.0001-10$ mg/m$^3$.

* * * * *